US 6,708,108 B2

United States Patent
Jones

(10) Patent No.: US 6,708,108 B2
(45) Date of Patent: Mar. 16, 2004

(54) VEHICLE NAVIGATION SYSTEM

(75) Inventor: Alan Henry Jones, Histon (GB)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/232,303

(22) Filed: Aug. 30, 2002

(65) Prior Publication Data

US 2003/0078721 A1 Apr. 24, 2003

(51) Int. Cl.$^7$ .............................................. G01C 21/34
(52) U.S. Cl. ........................ 701/200; 701/202; 701/209; 340/995.19; 340/996
(58) Field of Search ............................... 701/200, 202, 701/209, 210, 211; 340/995.19, 995.2, 995.21, 996

(56) References Cited

U.S. PATENT DOCUMENTS

| | | | | |
|---|---|---|---|---|
| 6,381,535 | B1 | * | 4/2002 | Durocher et al. ........... 701/202 |
| 6,405,123 | B1 | * | 6/2002 | Rennard et al. ............ 701/200 |
| 6,421,607 | B1 | * | 7/2002 | Gee et al. .................. 701/209 |
| 6,567,745 | B2 | * | 5/2003 | Fuchs et al. ............... 701/209 |
| 2002/0004720 | A1 | * | 1/2002 | Janoska ....................... 704/270 |
| 2003/0079135 | A1 | * | 4/2003 | Jones .......................... 713/182 |
| 2003/0109986 | A1 | * | 6/2003 | Tseng ......................... 701/211 |

FOREIGN PATENT DOCUMENTS

| | | |
|---|---|---|
| EP | 0 564 353 | 10/1993 |
| FR | 2 772 911 | 6/1999 |
| GB | 2 163 282 | 2/1986 |
| GB | 2 323 168 | 9/1999 |
| GB | 2 355 793 | 5/2001 |
| WO | WO 95/21435 | 8/1995 |

* cited by examiner

Primary Examiner—Gary Chin
(74) Attorney, Agent, or Firm—Ahsan & Associates; Aziz N. Ahsan; Samuel Dworetsky

(57) ABSTRACT

A vehicle navigation system comprises a processor connected to a wireless message receiver, such as a cellular telephone. The system includes an application which checks each message received by the telephone. If the message is recognised as being intended for navigation, the application identifies the action which the message requires and an associated location in the message. The application then performs the appropriate action, for example to plan a route passing through the location. A messaging device sends messages via a network to the receiver. The network provides a messaging service having a message store which stores messages when the receiver is inactive and sends stored messages when the receiver becomes active.

18 Claims, 2 Drawing Sheets

FIG 1

VEHICLE NAVIGATION SYSTEM

FIELD OF THE INVENTION

The present invention relates to a vehicle navigation system.

SUMMARY OF THE INVENTION

According to the invention, there is provided vehicle navigation system comprising:

an apparatus located on board a vehicle and comprising a wireless message receiver which is inactive when the vehicle is switched off, a navigation information processor, and an application for: recognising a message from the receiver containing an instruction for a navigation-associated action; interpreting a location defined in the recognised message and associated with the action; and causing the processor to perform the instruction;

a messaging service including a message store for storing messages directed to the receiver when the receiver is inactive and for sending the or each stored message when the receiver becomes active; and a messaging device usable, when the vehicle is switched off, for sending to the messaging service a message containing an instruction for a navigation-associated action.

The system may comprise means for generating a vehicle itinerary. The action may comprise entering the location in the itinerary. The application may be arranged to interpret the location as any one of a startpoint, a waypoint, a via, a destination, and a stop. When the application interprets the location as a stop, it may be arranged to interpret a dwell time associated with the stop. The application may be arranged to calculate an estimated time of arrival at a destination taking into account the dwell time.

The application may be arranged to interpret the location from geographical coordinates in the recognised message.

The application may be arranged to interpret the location from a name in the recognised message. The name may comprise a geographical name and/or may be programmable by a user.

The receiver may be arranged to communicate with a cellular telephone network.

The receiver may be an interface for a cellular telephone.

The message may comprise at least one data packet.

The messaging device may comprise a cellular telephone handset.

The location may be contained in a text field of the message. As an alternative, the location may be formed as additional data accompanying a text field of the message.

It is thus possible for vehicle navigation information to be sent to a vehicle from a remote source so that information entry or programming of the system does not have to be performed by a person in the vehicle. Thus, a driver does not have to enter such information before starting a journey or while driving a vehicle. The appropriate data may be transmitted, for example, from a home or office, for example during the planning of a journey with reference to maps, so that a suitable itinerary is available at the start of a journey in the vehicle.

BRIEF DESCRIPTION OF THE DRAWINGS

The invention will be further described, by way of example, with reference to the accompanying drawings, in which.

DETAILED OF DESCRIPTION

Figure 1:
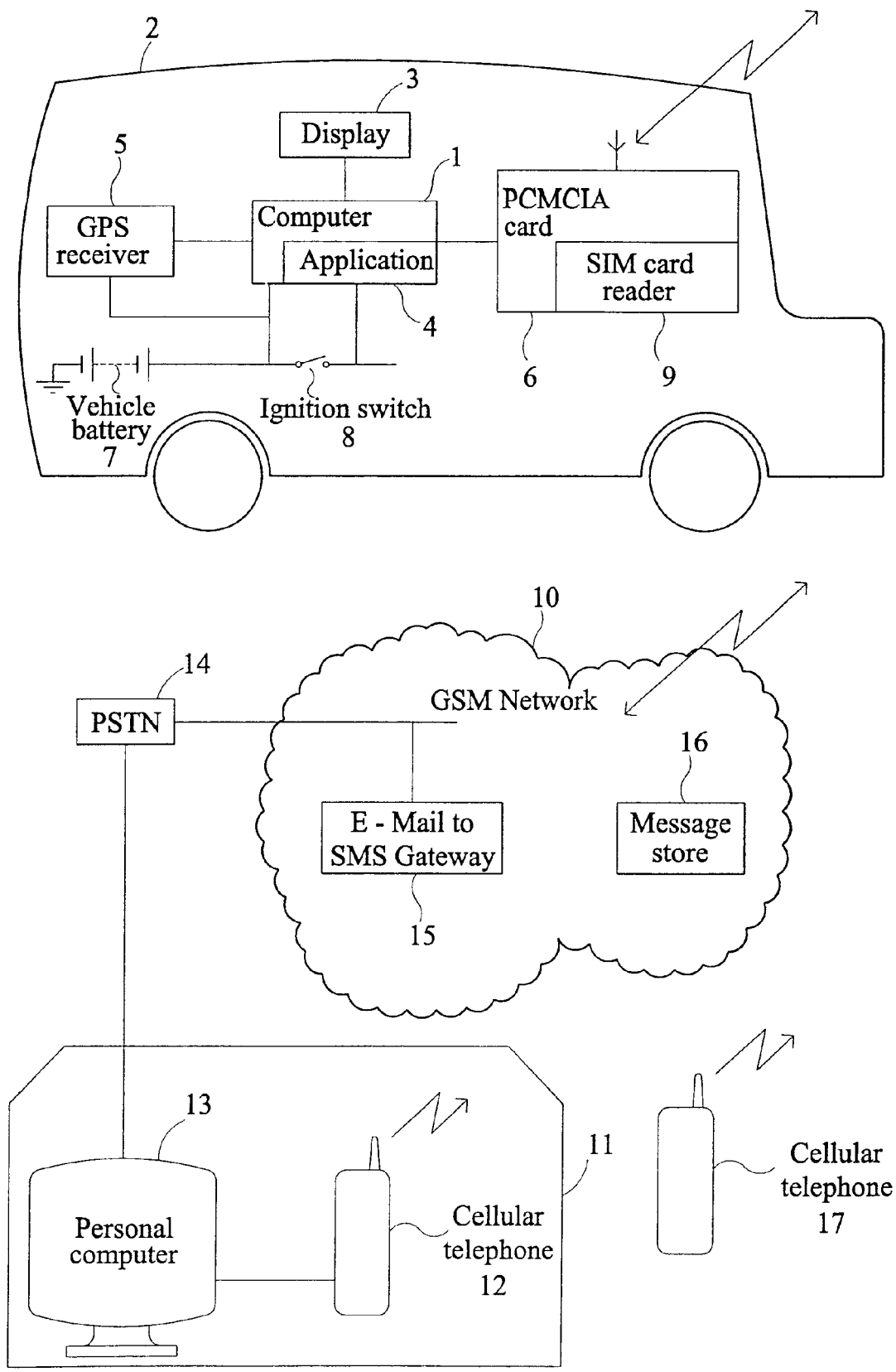
FIG. 1 is a schematic diagram illustrating a vehicle navigation system constituting an embodiment of the invention and arrangements for sending data to or programming the system.

FIG. 1 shows an on-board navigation system in the form of a computer 1 installed in a vehicle 2 and provided with a display 3 for displaying navigation (and other) information generated or supplied by the computer 1 to vehicle occupants (not shown). The navigation system further comprises a GPS receiver 5 connected to the computer 1 for supplying navigation data thereto. For example, the computer 1 may be a Pentium (RTM) based computer with remote display known as "Part No. CAR PC" available from Kontron and the GPS receiver may be a "Placer GPS 455" available from Trimble and comprising a GPS receiver with odometer and rate gyro inputs.

In addition to performing the conventional processing for the navigation system, the computer 1 contains an application illustrated at 4 in the form of a program which is resident in a program memory (not shown) of the computer 1 and which performs a method as described hereinafter. The application 4 has hardware and software interfaces for receiving text messages, such as SMS messages. The application 4 recognises messages which are intended for the navigation computer 1, and interprets such messages and causes the navigation system to respond appropriately.

The computer 1 is provided with a wireless messaging system in the form of a PCMCLA card 6. The card 6 is, for example, a Nokia (RTM) Card Phone Type RPE-1 and implements all of the cellular protocols including SMS text messaging. The card 6 receives power from the computer 1 and powers up and down automatically with the computer. The card 6 has a SIM card reader 9 for reading a SIM card of an occupant of the vehicle 2.

The computer 1 and the receiver 5 are supplied with power from a vehicle battery 7. The computer 1 has a control input connected to the battery 7 via a vehicle ignition switch 8. The computer 1 remains dormant when the switch 8 is off and is automatically booted when the switch 8 is turned on. When the ignition switch 8 is turned off, the computer runs for a predetermined time, for example of the order of a minute, before returning to its standby mode.

The card 6 is in wireless communication with a GSM network 10, which is able to relay data and/or instructions for the navigation computer 1 from a remote location illustrated in FIG. 1 as being a house or office building 11. Another cellular telephone 12 may be used for generating and transmitting navigation information via the network 10 to the card 6. If the telephone 12 has sufficient messaging capability, it may be used to send information to the navigation computer 1 from anywhere within the service area of the network 10. Alternatively, the telephone 12 may be connected to a suitable interface of a personal computer 13 which generates the navigation messages and transmits them via the telephone 12. Alternatively or additionally, as illustrated in FIG. 1, the personal computer 13 may contain a suitable modem for connection to a public switched telephone network (PSTN) 14 for transmitting the navigation messages to the network 10 for wireless relay to the card 6 and thence to the navigation computer 1. The computer 13 may send the navigation messages as e-mail messages which may be transmitted directly via the networks 14 and 10 if the navigation system has an e-mail address. Alternatively, the network 10 may include an e-mail to SMS gateway 15 for converting the messages from the computer 13 to SMS messages which are received by the card 6 and are recognised and interpreted by the application 4 in the navigation computer 1.

Although the navigation messages may be sent to the vehicle 2 while it is in operation in the sense that the ignition switch 8 is turned on, it will generally be more convenient to generate such messages in the telephone 12 or the computer 13 when the vehicle 2 is not in use such that the ignition switch 8 is turned off and the card 6 is powered down such that it cannot receive messages from the network 10. The network 10 contains a message store 16 which stores messages intended for the card 6, typically for several days, so that the messages are forwarded to the card 6 when it is powered up and is capable of receiving such messages.

When, for example, a driver of the vehicle 2 is planning an itinerary at home or in the office 11, navigation information can be entered from the telephone 12 or on the computer 13 for forwarding to the navigation computer 1. Any cellular telephone located anywhere in the service area of the network 10 may be used to send such information as SMS messages and this is illustrated by the telephone at 17 whose location is completely arbitrary and which can generate the messages without needing a computer.

The navigation information may include the location of one or more waypoints (which are required to be displayed by the display 3 but are not a part of the route of the itinerary), one or more vias (through which the route of the itinerary must pass if the via is a point or with which the route must intersect if the via is an extended feature such as a road or region), a stop (a via where the vehicle will dwell for an interval which can also be selected), a destination (a via where the route is to terminate), and, if the journey is to start from a location which is different from the present location of the vehicle 2, a startpoint. The or each message is sent directly from the telephone 12 or via the PSTN 14 to the network 10. If the card 6 is registered with the network as being available, the or each message can be forwarded directly by the network 10 to the card. However, more usually, the card 6 is inactive and is not registered with the network 10 so that the messages are stored in the message store 16 for subsequent transmission.

Figure 2:
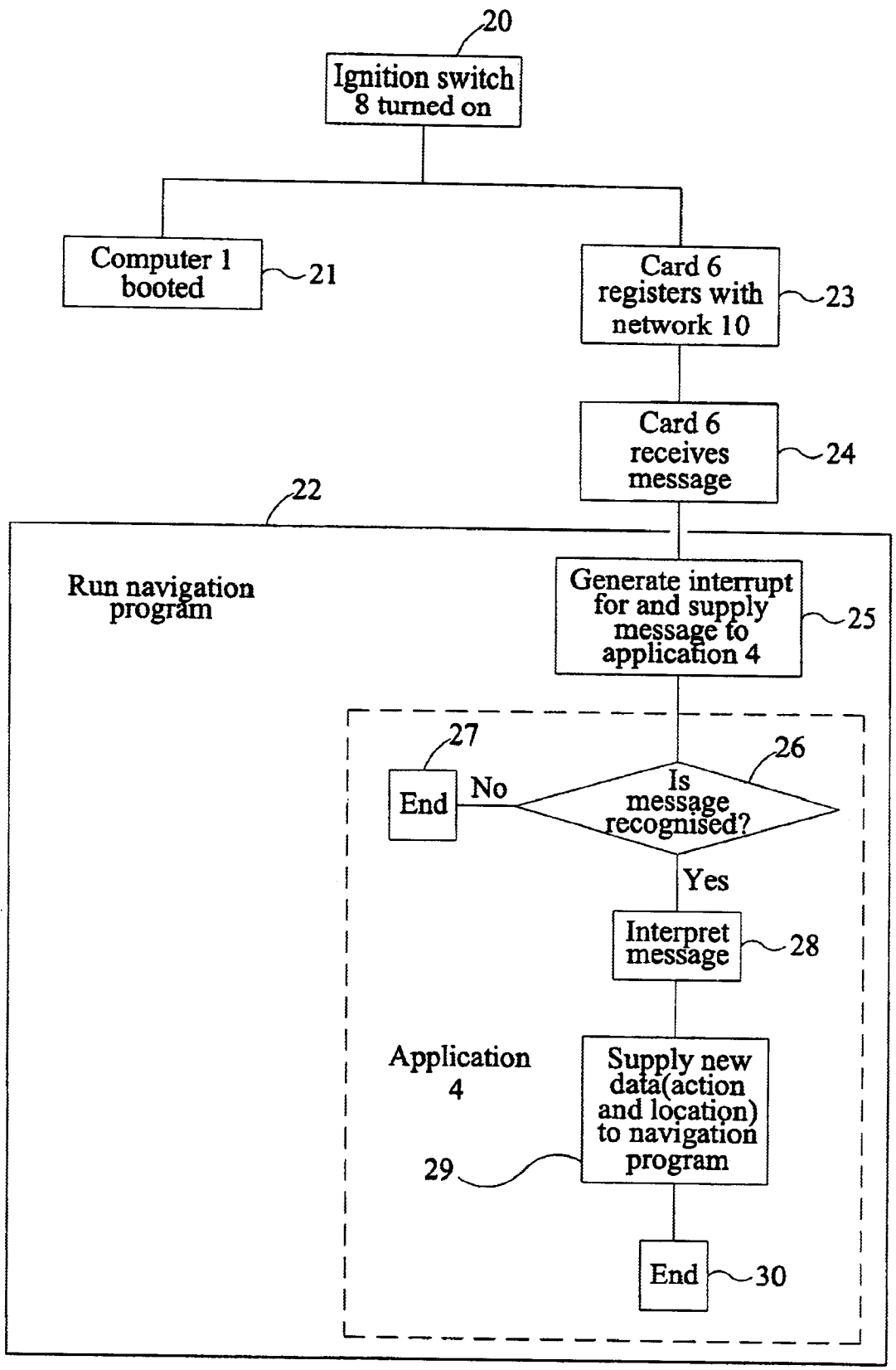
FIG. 2 is a flow diagram illustrating a method performed by the system of FIG. 1 and constituting an embodiment of the invention.

FIG. 2 illustrates the operation of the systems on board the vehicle 2. When the ignition switch 8 is turned on at 20, the computer 1 is booted at 21 and the navigation program is run at 22. At the same time, the card 6 is registered with the network 10 at 23.

When the card 6 receives a message at 24, it informs the navigation program 22, which, in the example illustrated, generates an interrupt for the application 4 and supplies the message to the application 4 as illustrated at 25. The application 4 is thus run and the message is checked at 26 to ascertain whether it is recognised as being intended for the navigation system. If not, the application 4 ends at 27.

If the message is recognised as being intended for the navigation system, it is interpreted at 28, typically so as to identify the action which is required to be performed and a location associated with the action. The new data indicating the action and the associated location are supplied at 29 to the navigation program, which takes the appropriate action to update the vehicle itinerary, after which the application 4 ends at 30.

Various messages can be sent to the navigation computer 1 in this way. For example, each message may have the format "(action) (location)", where "action" refers to the action which the navigation system is to take and "location" refers to a location associated with the action. For example, if a message begins with "WPT", it is recognised in the step 26 as being intended for the navigation system and the step 28 attempts to interpret the "location" field as location coordinates in any likely format including Ordnance Survey grid coordinates, latitude and longitude, and UTM (Universal Transverse Mercator) coordinates. Assuming that the step 28 is able to recognise the location in the message, a waypoint is created within the navigation program 32, for example with the program 22 being arranged to display the location when the relevant part of the route or itinerary is being displayed in the vehicle 2 by the display 3.

If the action field of the message is "DEST", the associated location is used as the destination, for example for route planning, navigation and estimated time of arrival (ETA) computations. Thus, locations can be transmitted at the time they are found, for example, from a guide book or from reading a map. It is not, therefore, necessary to make a note of or try to remember such locations and then have to enter them when in the vehicle before starting a journey or during a journey.

The locations may be specified in other ways, such as well-known names which are recognised by the navigation program 22 or personal names which have been entered in the computer 1. Examples of well-known names include geographical names such as roads, villages, towns, cities and counties. Examples of personal names include the names of relatives for identifying the location of their houses, the names of cafes, restaurants and hostelries which are frequented. Locations can also be specified by generic names, such as "fuel", "services", and "food".

If space allows, several actions may be combined in a single message. An example of such a message is "VIA A14, VIA A1, WPT Doncaster, VIA Alfreton, STOP 1 hour N53.40298 W1.78475 Snake Pass, DEST Grandma's". Such a message causes the navigation computer 1 to generate an itinerary in which the route is required to proceed by the A14 road, the A1 road, the town of Alfreton, a location indicated by latitude north 53.40298 and longitude west 1.78475 (identified as a countryside feature known as the Snake Pass), ending at the driver's grandmother's house whose coordinates are known to the navigation program 22. The computer 1 is required to display the name "Doncaster" on the display 3 when the relevant part of a map is being displayed. When calculating an estimated time of arrival, the navigation program 22 makes note of the intention to stop at the Snake Pass for one hour.

Such messages may be typed into the keypad of the telephone 12 or could be sent from the computer 13, which is equipped with a messaging device (illustrated in FIG. 1 as comprising the telephone 12 or a modem connection to the PSTN 14). In the case of computer-generated messages, such messages may be typed or may be synthesised directly by a route planning tool such as Microsoft Autoroute (RTM), and may be sent to the message interface from enhanced applications or may be cut and pasted to a message tool, such as Nokia's Cardphone software (RTM).

In the case of a cellular telephone system having the capability of identifying the location of the telephone 17, the location may be entered automatically, if desired, into the message which is then sent to the vehicle 2. This may be used to send a message to the vehicle 2 encoding a waypoint, a via or a destination whose location is automatically entered by the telephone 17 or by the network 10. The message may contain text identifying the location.

To simplify this operation, the telephone 17 may be arranged to permit the selection of a "send location message" function, which allows the text to be entered and automatically inserts into the resulting message the current location of the telephone 17. The function may then allow the appropriate instruction to be selected so that the message is defined as relating to a waypoint, destination, via or the like. The accompanying text may be used to provide useful information about the location, such as "This pub has good food" or "Sent from OS Grid 545000 124000".

Such a system thus makes the programming of or supplying of information to an on-board vehicle navigation system much easier and more convenient. Messages for the navigation system can be generated and transmitted whenever and wherever convenient. A journey can be commenced without having to enter data into the navigation system in the vehicle.

What is claimed is:

1. A vehicle navigation system comprising:
   an apparatus located on-board a vehicle and comprising a wireless message receiver which is inactive when said vehicle is switched off, a navigation information processor, and an application for: recognising a message from said receiver containing an instruction for a navigation-associated action; interpreting a location defined in said recognised message and associated with said action; and causing said processor to perform said instruction;
   a messaging service including a message store for storing messages directed to said receiver when said receiver is inactive and for sending each said stored message when said receiver becomes active; and
   a messaging device usable, when said vehicle is switched off, for sending to said messaging service said message containing said instruction for said navigation-associated action.

2. A system as claimed in claim 1, in which said messaging service comprises an SMS messaging service.

3. A system as claimed in claim 1, in which said messaging service comprises an e-mail service.

4. A system as claimed in claim 1, comprising means for generating a vehicle itinerary.

5. A system as claimed in claim 4, in which said action comprises entering said location in said itinerary.

6. A system as claimed in claim 5, in which said application is arranged to interpret said location as any one of a startpoint, a waypoint, a route, a destination, and a stop.

7. A system as claimed in claim 6, in which, when said application interprets said location as a stop, said application is arranged to interpret a dwell time associated with said stop.

8. A system as claimed in claim 7, in which said application is arranged to calculate an estimated time of arrival at a destination taking into account said dwell time.

9. A system as claimed in claim 1, in which said application is arranged to interpret said location from geographical coordinates in said recognised message.

10. A system as claimed in claim 1, in which said application is arranged to interpret said location from a name in said recognised message.

11. A system as claimed in claim 10, in which said name comprises a geographical name.

12. A system as claimed in claim 10, in which said name is programmable by a user.

13. A system as claimed in claim 1, in which said receiver is arranged to communicate with a cellular telephone network.

14. A system as claimed in claim 1, in which said receiver is an interface for a cellular telephone.

15. A system as claimed in claim 1, in which said message comprises at least one data packet.

16. A system as claimed in claim 1, in which the messaging device comprises a cellular telephone handset.

17. A system as claimed in claim 1, in which said location is contained in a text field of said message.

18. A system as claimed in claim 1, in which said location is formed as additional data accompanying a text field of said message.

* * * * *